(12) United States Patent
Freeman et al.

(10) Patent No.: US 6,707,574 B1
(45) Date of Patent: Mar. 16, 2004

(54) PROVIDING OF PRINT JOB ATTRIBUTES FOR LATER ACCESS BEFORE PRINTING

(75) Inventors: Tracy K. Freeman, Boise, ID (US); Alan J. Oyama, Caldwell, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/405,895

(22) Filed: Sep. 24, 1999

(51) Int. Cl.[7] .............................................. G06K 15/00
(52) U.S. Cl. .......................................... 358/1.9; 358/1.3
(58) Field of Search ........................... 358/1.1, 1.2, 1.6, 358/1.9, 2.1, 1.11, 1.13, 1.14, 1.16, 1.17, 524, 403, 404; 399/76, 77, 81, 82, 83, 85, 86, 87

(56) References Cited

U.S. PATENT DOCUMENTS

| | | | |
|---|---|---|---|
| 5,327,526 A | 7/1994 | Nomura et al. | ............. 395/115 |
| 5,873,659 A | 2/1999 | Edwards et al. | ............. 400/61 |

FOREIGN PATENT DOCUMENTS

| | | | |
|---|---|---|---|
| EP | 0469865 A2 | 2/1992 | .......... G06K/15/00 |
| EP | 0704791 A1 | 4/1996 | ............. G06F/3/12 |
| EP | 0714058 A1 | 5/1996 | ............. G06F/3/12 |
| EP | 0738957 A2 | 10/1996 | ............. G06F/3/12 |
| EP | 0806721 A1 | 11/1997 | ............. G06F/3/12 |

*Primary Examiner*—Arthur G. Evans

(57) ABSTRACT

A method of providing print job attributes for later access before printing of the job includes collecting and storing print job attributes of the print job in a manner that makes them accessible for viewing. The attributes may later be viewed in response to a user query of a stored print job. From the attributes, a user can determine when and whether the stored print job should be printed. The collected attributes may also be used to determine the order of printing jobs stored in a print queue.

25 Claims, 7 Drawing Sheets

PROVIDING OF PRINT JOB ATTRIBUTES FOR LATER ACCESS BEFORE PRINTING

FIELD OF THE INVENTION

This invention relates generally to computer printers and software thereof, and more particularly relates to a method of providing information about a print job to a user prior to its printing.

BACKGROUND AND SUMMARY OF THE INVENTION

In the field of computer printing, a print job such as a word processing document consists of printer commands and data that are sent in a single batch from an input device such as a computer to a printing device such as a printer. Printer control commands contain explicit attributes of the print job such as a selected paper size, media type, and priority. Page description language (PDL) instructions contain the data as well as formatting commands such as line width and page separation. Software routines stored as firmware within the printer interpret the print job and print it.

Normally, a print job is immediately sent to the printer for printing once the job has been created. If the printer is busy with another job, the later print job is queued outside the printer and then printed once the printer is free.

In certain circumstances, it may be desirable to determine the nature of the print job before printing it. For example, if the print job is a massive document that will occupy the printer for some time, it may be best to print the job after normal work hours. Or, before printing the job, it may be desirable to determine the number of pages it contains, the time required for printing, the amount of toner required, to be sure that it can be printed. This information is contained in the attributes of the print job. With this information, a user can decide when the print job should be printed and whether there is adequate paper, toner, and other printing resources present in the printer before printing it.

A drawback of present printers is that they do not permit a user to view the attributes of a print job stored in the printer prior to deciding whether to print it. A further drawback of present printers is that they do not take the attributes into account in determining which of several print jobs in a queue to print. Presently, print jobs in a queue are printed on a first in, first out order, regardless of the size or other attributes of the jobs, unless the user has indicated that a later print job has higher priority than an earlier one.

The invention overcomes theses drawbacks through a method of providing print job attributes for later access and display before printing of the job. The method includes collecting print job attributes of a print job, storing the collected attributes and the print job; and accessing the collected attributes in response to a query of the stored print job. From the accessed attributes, a user can determine when and whether a print job should be executed. The invention also provides a method for a printer to place the print jobs in a queue based on their attributes.

Additional features and advantages of the invention will be made apparent from the following detailed description of an illustrative embodiment which proceeds with reference to the accompanying drawings.

DETAILED DESCRIPTION OF THE INVENTION

Figure 1:
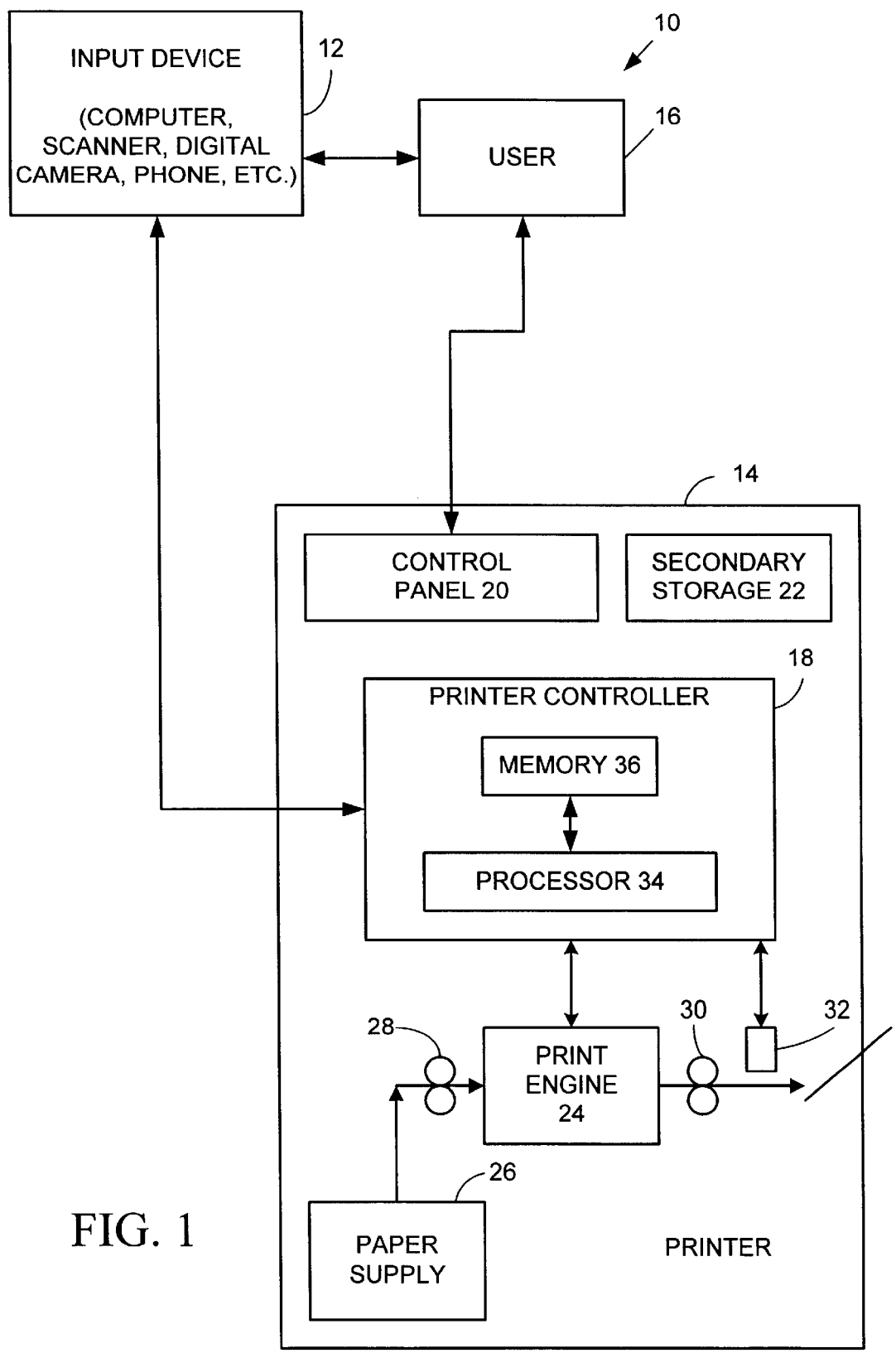
FIG. 1 is a block diagram of a printing system embodying the invention, including an input device and a printer.

FIG. 1 is a block diagram of a printing system 10 embodying the invention, including an input device 12 and a printer 14. The input device 12 may be any type of device capable of creating a print job such as a computer running a word processor that creates a document, a scanner, or camera creating a graphics file. The input device 12 communicates a print job to the printer 14 in response to commands of a user 16. The printer 14 is largely of conventional design, except in the programming of its printer controller 18, as will be explained. Other components of the printer 14 include a control panel 20, computer-readable storage medium 22 (which may include secondary storage such as a disk or primary storage such as random access memory (RAM)), a print engine 24, a paper supply 26, paper handling mechanisms 28 and 30, and an exit detector 32.

The printer controller 18 includes a processor 34, computer-readable storage medium in the form of memory 36, and firmware contained in the memory. The firmware includes software routines that work in accordance with the invention upon print jobs received from an input device 12.

Figure 2:
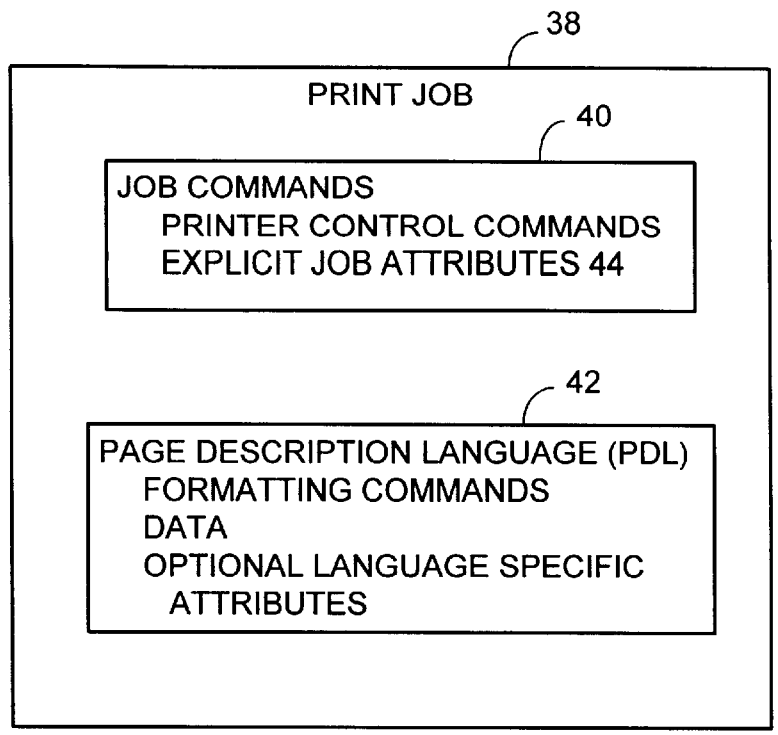
FIG. 2 is a block diagram of a print job that is sent from the input device to the printer.

FIG. 2 is a block diagram of a print job 38 that is sent from the input device 12 to the printer 14. One portion 40 of the print job is job commands including printer control commands and explicit job attributes 44. Another portion 42 of the print job is page description language (PDL) instructions such as PostScript® or PCL® instructions that describe the output to the printer, which then uses the instructions to construct text and graphics to create the desired page image. Included with the PDL instructions are formatting commands, the data to be printed, and any optional language-specific attributes.

Figure 3:
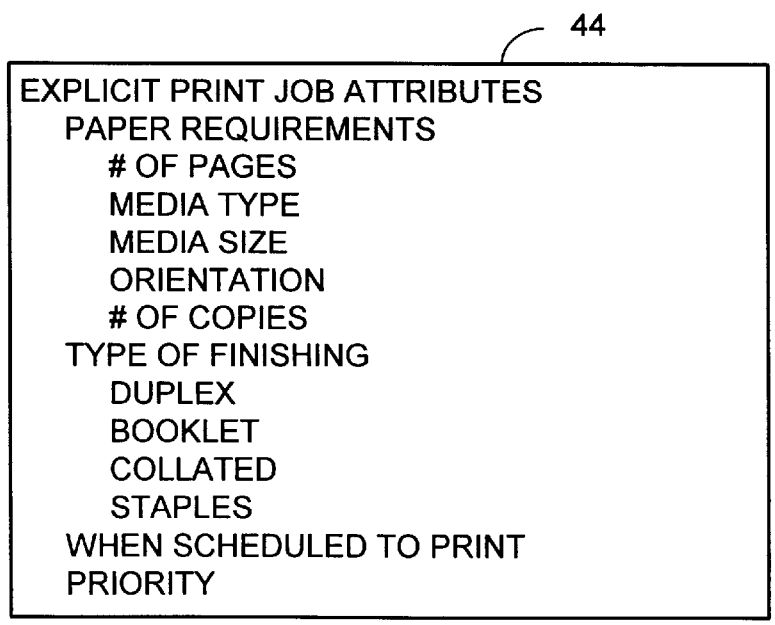
FIG. 3 is a block diagram of exemplary explicit job attributes contained within the print job of FIG. 2.

FIG. 3 is a block diagram of exemplary explicit job attributes 44 contained within the print job of FIG. 2. These attributes may include the job's paper requirements such as the number of pages, number of copies, orientation of the pages, media size, and media type. Other explicit attributes may include the type of finishing, when the job is scheduled to print, the print job's user-specified queue priority, etc.

Figure 4:
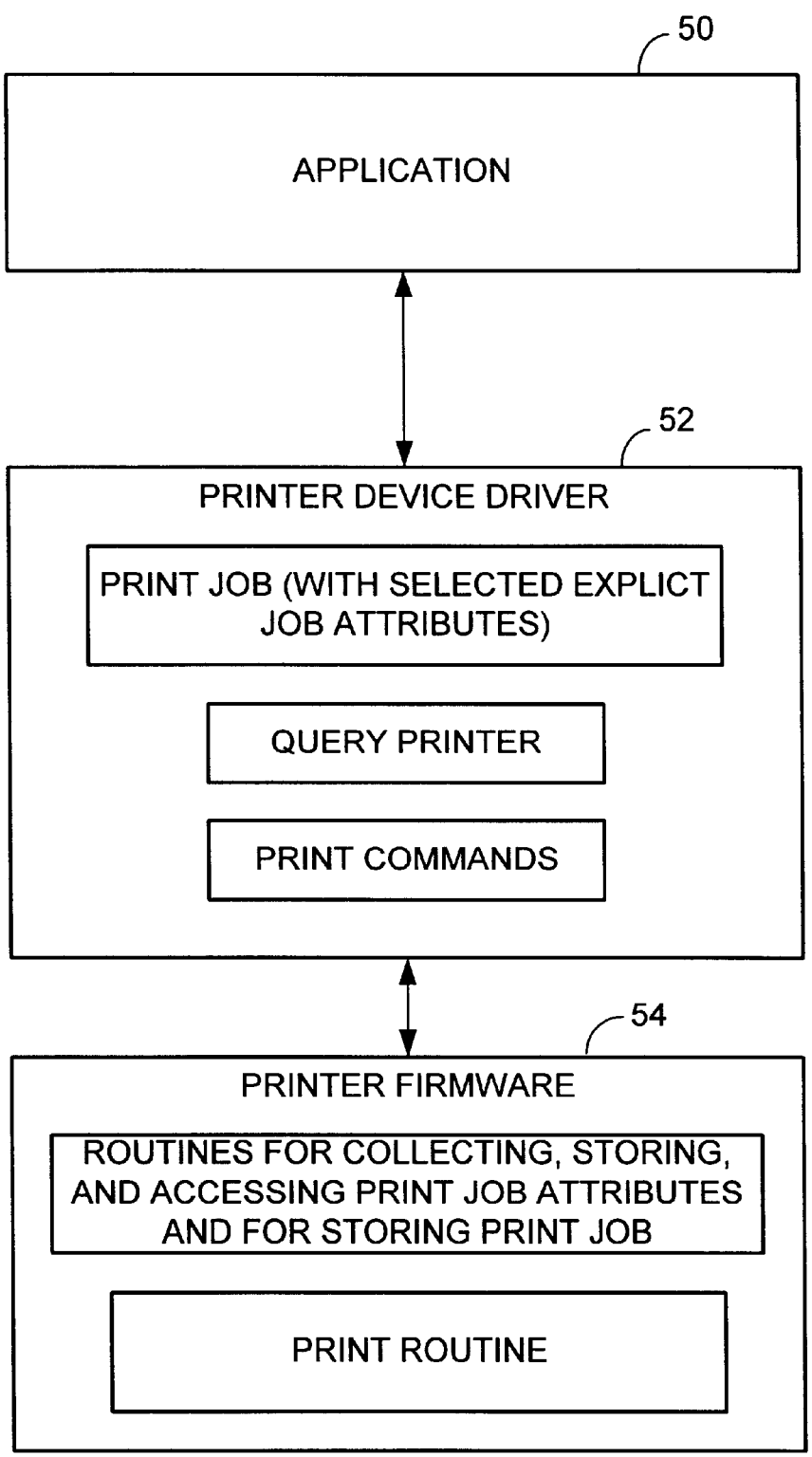
FIG. 4 is a block diagram of software in the system of FIG. 1 for practicing the invention.

FIG. 4 is a block diagram of software routines contained in the system 10 for practicing the invention. An application 50 within the input device 12 sends a document or other print job to print to the printer 14 through a printer device driver 52. The driver may be embedded within the application or be separate from it, depending upon the nature of the input device. The driver contains software routines for creating a print job, querying the printer for print job status, and for conveying the print job to the printer. Printer firmware 54 stored within the memory 36 of the printer controller 18 acts in response to the print job sent by the printer driver 52. The firmware includes software routines for collecting attributes from a print job, storing them, and accessing the stored print job attributes, for storing the print job, and for printing the print job.

Figure 5:
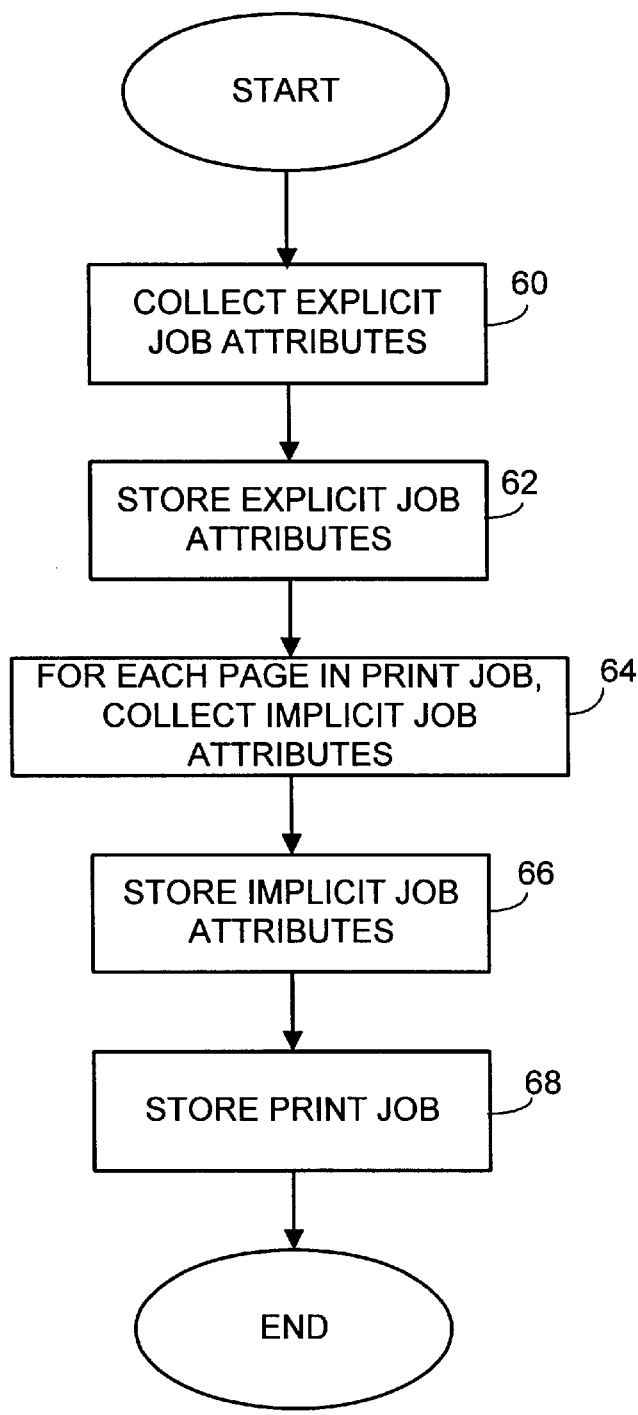
FIG. 5 is a flowchart of a method of storing print job attributes for retrieval in accordance with the invention.

FIG. 5 is a flowchart of a method of storing print job attributes for later retrieval in accordance with the invention. This method is practiced in the illustrative embodiment by a software routine with the printer firmware 54. Assume that a print job has been received at the printer 14 with instructions that it be stored prior to printing. A software routine within the printer controller 18 identifies the explicit job attributes and collects them (60). Explicit attributes are those specified by a user, such as the examples shown in FIG. 3. The collected attributes are stored in storage 22 (62). The routine then examines each page in the print job to identify and collect attributes implicit in the nature of the job (64). Implicit attributes are those derived from the nature of the print job such as the job's printer memory requirements, the amount of consumables (such as toner) required to print the job, and the time required to print. The implicit attributes are then stored with the explicit attributes (66) in storage 22. The print job is also stored in storage for retrieval and printing at the user's request (68).

Figure 6:
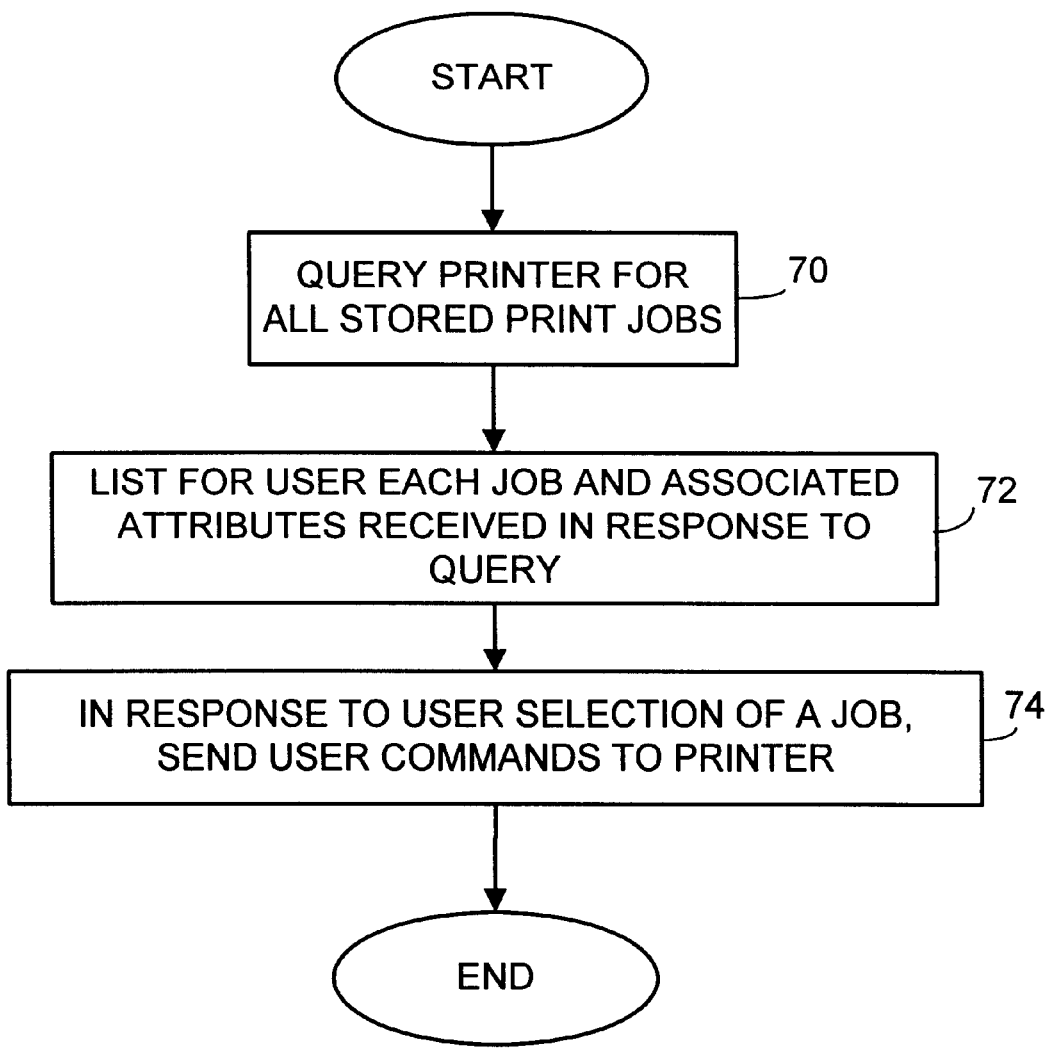
FIG. 6 is a flowchart of a method of accessing stored print job attributes through software of an input device in accordance with the invention.

The stored print job attributes are accessed from storage 22 when a user desires to examine the print job prior to printing. This access may be achieved in a number of ways. FIG. 6 is a flowchart of a method of accessing the stored print job attributes through software of an input device. As shown in FIG. 2, the printer driver 52 contains a query printer routine that enables a user to check from a computer or other input device on the status of a stored print job. In response to a user request, the driver queries the printer for all stored print jobs (70). The printer responds by listing at the input device each print job and its associated job attributes (72). The user can then select a print job for printing based on its attributes. In response to a user selection of a job (74), the driver directs the printer to retrieve the selected job from storage 22 into printer memory 36 and print it.

A printer driver is only one of a number of software routines that may be used to store or access print job attributes. Other software routines, such as administrative software, may be used, where such routines are capable of communicating appropriate commands to the printer controller.

Figure 7:
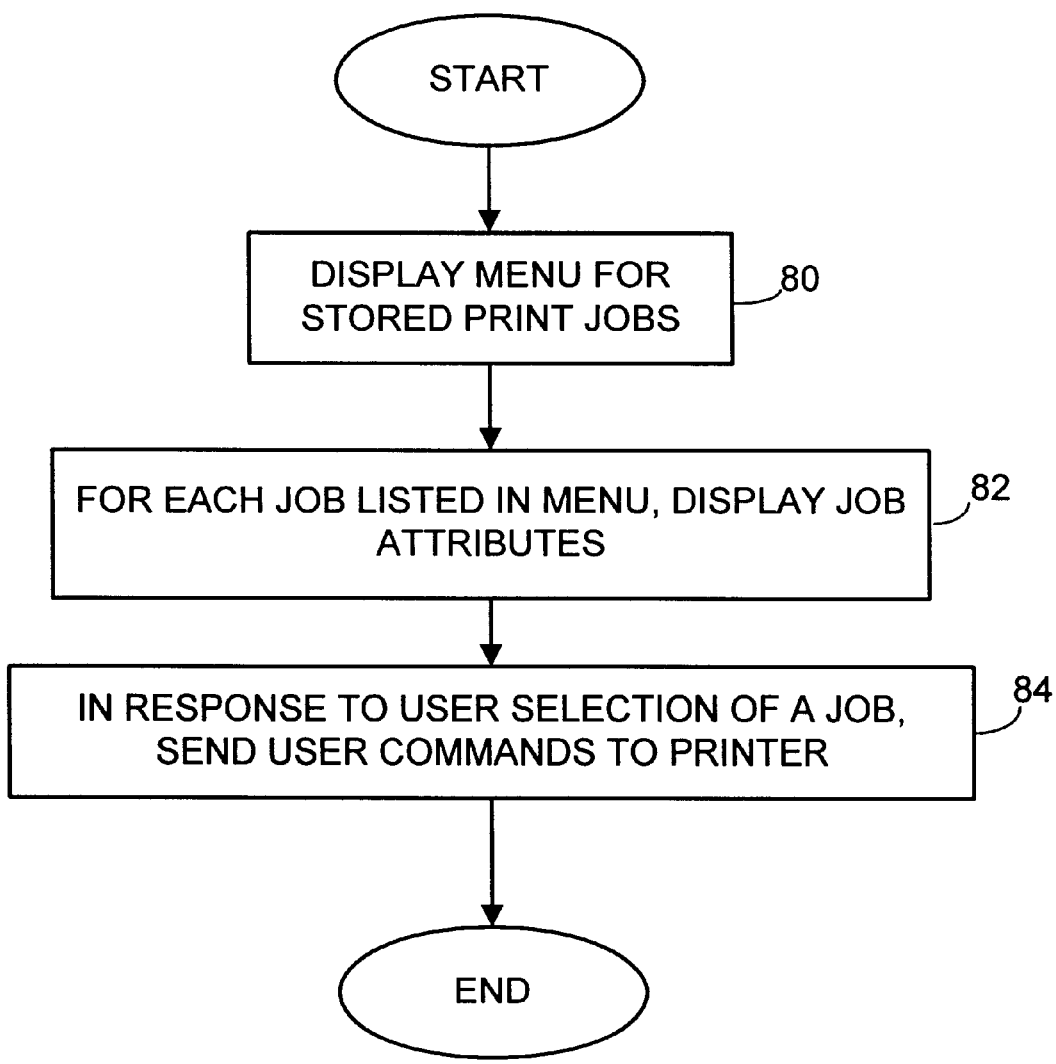
FIG. 7 is a flowchart of a method of accessing stored print job attributes through the control panel of a printer in accordance with the invention.

Another way of accessing attributes of stored print jobs is through direct user interaction with the printer via its control panel 20. FIG. 7 is a flowchart of a method of accessing the stored print job attributes through the control panel. The user presses buttons on the control panel to display a menu for the stored print jobs (80). Through a series of button presses, the user can view each stored print job and its associated attributes (82). When a desired print job is displayed in the menu, the user presses the correct button to read the print job from storage 22 into printer memory 36 and print it (84).

Figure 8:
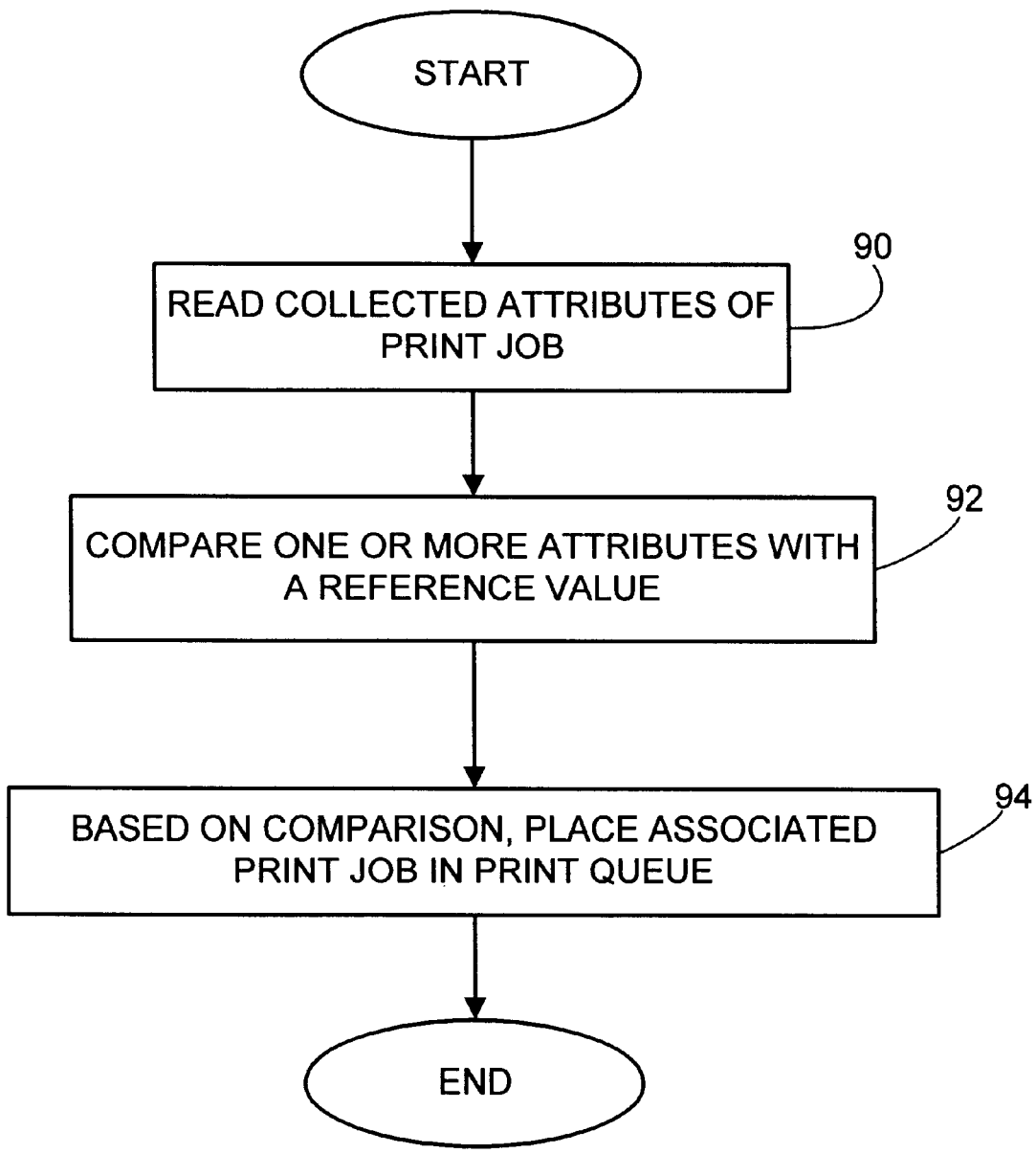
FIG. 8 is a flowchart of a method of accessing stored print job attributes for determining an order of printing queued print jobs in accordance with the invention.

User intervention can be minimized by having the printer controller 18 make decisions on the order or timing of printing stored print jobs. A software routine within the firmware of the printer controller 18 manages a delayed print queue in memory and decides, based on the collected attributes, the order in which stored print jobs should be printed. For example, stored print jobs with fewer than a certain number of pages may be given priority over print jobs with greater than another number of pages. FIG. 8 is a flowchart of such a method of ordering stored print jobs for printing in accordance with the invention. As each print job is stored within storage 22, one or more designated collected attributes of the job are read, such as the number of pages (90). The attribute(s) of interest are then compared with a reference value(s) (92). This value may be one of several values or for the same attribute or different values for different attributes. Based on the comparison, the stored print job is given a priority and placed in the delayed print queue (94). Print jobs with the highest priority are placed at the beginning of the queue. Those with an intermediate priority are placed in the middle of the queue. Jobs with a low priority are placed at the end of the queue.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of printer or computer apparatus, unless indicated otherwise. Various types of general purpose or specialized computer apparatus may be used with or perform operations in accordance with the teachings described herein. Elements of the illustrative embodiment shown in software may be implemented in hardware and vice versa. If implemented as software, these elements may be stored in various computer-readable media in the printing system.

Further, although illustrated as implemented in a computer printer, the invention can be practiced in other types of printers, such as copiers, fax machines, combined purpose printers, etc., and the term should be interpreted broadly enough to cover all such printers.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. A method of providing print job attributes for later access before printing of the job, the method comprising:
   automatically determining print job attributes of a print job without user input;
   storing the collected attributes and the print job for later access before printing of the job.

2. The method of claim 1 including accessing the collected attributes in response to a query of the stored print job.

3. The method of claim 1 wherein collecting print job attributes includes collecting implicit and explicit job attributes.

4. The method of claim 1 wherein storing the collected attributes and the print job comprise storing the attributes and print job within storage associated with a printer.

5. The method of claim 1 including displaying the collected attributes.

6. The method of claim 5 wherein displaying includes listing each stored print job and its associated collected attributes.

7. A computer-readable storage medium on which is stored software for executing the method of claim 1.

8. The method of claim 1 including:
   reading the collected attributes of a print job;

comparing a collected attribute against a reference value; and placing the associated print job in a print queue in a given order based upon the comparison.

9. A printer comprising:

a printer controller; and a computer-readable storage medium on which is stored software executable by the printer controller for automatically determining print job attributes of a print job sent to the printer from a user computing device, storing the collected attributes, and accessing the collected attributes in response to a query of the stored print job.

10. The printer of claim 9 including a menu display displaying a stored print job and its collected print job attributes in response to a query of the stored print job.

11. A method of ordering print jobs in a queue, comprising:

automatically determining a print job attribute of a received print job sent from a user computer device;

comparing the determined attribute against a reference value; and placing the associated print job in a print queue in a given order based upon the comparison between the attribute and the reference value.

12. A computer-readable storage medium on which is stored software for executing the method of claim 11.

13. The method of claim 3, wherein the explicit print job attributes include at least one of a number of pages, a number of copies, an orientation of pages, a media size, and a media type.

14. The method of claim 3, wherein the explicit print job attributes include at least one of a type of finishing, a time when the job is scheduled to print, and a user queue priority.

15. The method of claim 3, wherein the implicit print job attributes include at least one of a print memory requirement, an amount of consumables required to print the job, and a time required to print.

16. The printer of claim 9, wherein the software executable by the printer controller is configured to automatically determine at least one of a number of pages, a number of copies, an orientation of pages, a media size, and a media type.

17. The printer of claim 9, wherein the software executable by the printer controller is configured to automatically determine at least one of a type of finishing, a time when the job is scheduled to print, and a user queue priority.

18. The printer of claim 9, wherein the software executable by the printer controller is configured to automatically determine at least one of a print memory requirement, an amount of consumables required to print the job, and a time required to print.

19. The method of claim 11, wherein automatically determining a print job attribute includes determining at least one of a number of pages, a number of copies, an orientation of pages, a media size, and a media type.

20. The method of claim 11, wherein automatically determining a print job attribute includes determining at least one of a type of finishing, a time when the job is scheduled to print, and a user queue priority.

21. The method of claim 11, wherein automatically determining a print job attribute includes determining at least one of a print memory requirement, an amount of consumables required to print the job, and a time required to print.

22. The method of claim 8, wherein comparing a collected attribute comprises comparing a number of pages the print job comprises to a reference number of pages.

23. The method of claim 8, wherein placing the associated print job in a print queue comprises assigning a priority to the print job in a scheme in which higher priority print jobs are placed ahead of lower priority print jobs in the print queue.

24. The method of claim 11, wherein comparing the determined attribute comprises comparing a number of pages the print job comprises to a reference number of pages.

25. The method of claim 11, wherein placing the associated print job in a print queue comprises assigning a priority to the print job in a scheme in which higher priority print jobs are placed ahead of lower priority print jobs in the print queue.

* * * * *